United States Patent
Eimers

[15] 3,669,991
[45] June 13, 1972

[54] N-ARYL-SUBSTITUTED DIALKANOLAMINO-POLYURETHANES

[72] Inventor: Erich Eimers, Krefeld, Germany

[73] Assignee: Farbenfabriken Bayer Aktiengesellschaft, Leverkusen, Germany; F 52853

[22] Filed: Sept. 25, 1970

[21] Appl. No.: 75,714

Related U.S. Application Data

[63] Continuation-in-part of Ser. No. 735,511, June 10, 1968, abandoned.

[30] Foreign Application Priority Data

July 4, 1967  Germany..............................F 52 853

[52] U.S. Cl.....................260/34.2, 260/30.4 N, 260/31.2 N, 260/33.2 R, 260/33.6 UB, 260/77.5 AP, 260/77.5 AQ, 260/77.5 MA
[51] Int. Cl. .....................................C08g 41/04, C08g 22/06
[58] Field of Search...........260/77.5 AP, 77.5 MA, 77.5 AQ, 260/859, 34.2

[56] References Cited

UNITED STATES PATENTS 2,939,851  6/1960  Orchin...................................260/2.5

FOREIGN PATENTS OR APPLICATIONS

| 751,841 | 7/1956 | Great Britain |
| 807,808 | 1/1959 | Great Britain |
| 874,082 | 8/1961 | Great Britain |
| 1,151,116 | 7/1963 | Germany |
| 1,217,611 | 5/1966 | Germany |

OTHER PUBLICATIONS

Flory-Principles of Polymer Chemistry, Cornell Univ. Press, Ithaca, N.Y. (1953) pages 40– 41, 45– 46. Call No. QD281P6F66.
Lenz-Organic Chemistry of Synthetic High Polymers, Interscience, New York (1967) pages 3, 4, 11, 12, 53– 56, 186– 189. Call No. QD281P6L4.

Primary Examiner—Donald E. Czaja
Assistant Examiner—H. S. Cockeram
Attorney—Connolly and Hutz

[57] ABSTRACT

The invention relates to N-aryl-substituted dialkanolamino-polyurethane compounds containing alkyl or aryl terminal groups and corresponding to the formula

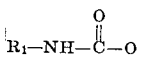

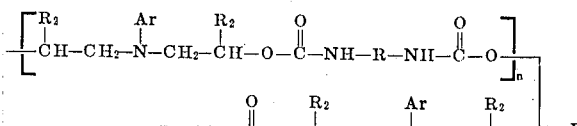

or

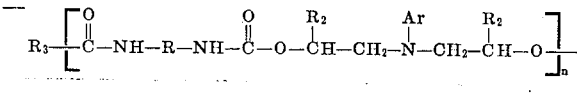

in which Ar denotes aryl, R is alkylene or arylene, $R_1$ is alkyl, allyl methoxymethyl or aryl, $R_2$ is H or $-CH_3$, $R_3$ is $-O-R_4$ or $-S-R_4$ or

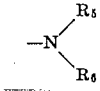

$R_4$ is alkyl or

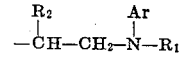

$R_5$ is H or alkyl or aryl, $R_6$ is alkyl or aryl, $n$ is 1 to about 10, preferably 1 to about 5, and a process for their production.

9 Claims, No Drawings

N-ARYL-SUBSTITUTED DIALKANOLAMINO-POLYURETHANES

This is a continuation-in-part of our previously copending application "N-ARYL-SUBSTITUTED DIAL-KANOLAMINO-POLYURETHANES," Ser. No. 735,511, filed June 10, 1968 and now abandoned.

The object of the invention comprises N-aryl substituted dialkanolamino-polyurethane compounds containing alkyl or aryl terminal groups and corresponding to the formula

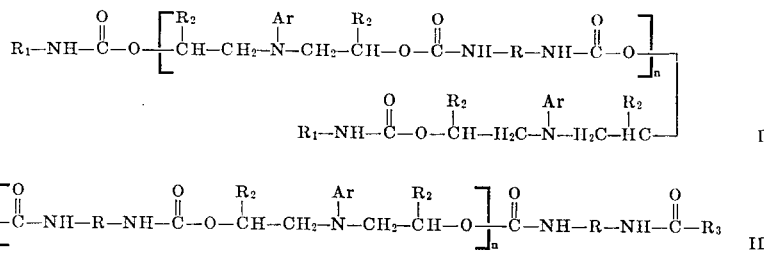

or

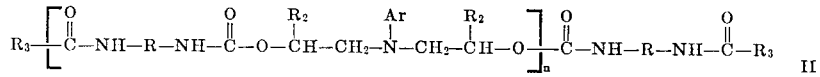

in which Ar denotes aryl, R is alkylene or arylene, $R_1$ is alkyl, allyl, methoxymethyl or aryl, $R_2$ is H or $-CH_3$, $R_3$ is $-O-R_4$ or $-S-R_4$ or

$R_4$ is alkyl or

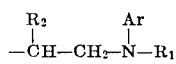

$R_5$ is H or alkyl or aryl, $R_6$ is alkyl or aryl, $n$ is 1 to about 10, preferably 1 to about 5, and a process for their production.

At room temperature, the dialkanolamino-polyurethanes are crystallized or highly viscous to solid resinous materials.

The process for their production consists in that a N-aryl-substituted dialkanolamine of the formula

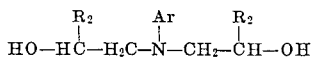 III is reacted with a diisocyanate of the formula $$O = C = N - R - N = C = O \quad (IV)$$

and a monoisocyanate of the formula $$R_1 - N = C = O \quad (V)$$

or with a monoalcohol, a monothioalcohol or a primary or secondary amine of the formulas

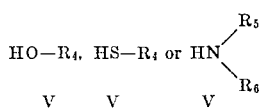
V   V   V in the molar ratio of 2:1:2 to about 11:10:2, preferably to about 6:5:2, or 1:2:2 to about 10:11:2, preferably to about 5:6:2, at temperatures of about 50° to about 150° C, preferably about 80° to about 120° C, in the presence or absence of solvents.

A preferred method of carrying out the process consists in reacting the dialkanolamine and the diisocyanate in a molar ratio of 2:1 to about 11:10, preferably to about 6:5, or of 1:2 to about 10:11, preferably to about 5:6, and to react the monoisocyanate or monoalcohol or monothioalcohol or amine in the stated molar ratio on the reaction product. With other words: the molar ratios of the compounds III:IV:V may amount to 2:1:2 or 1:2:2; 3:2:2 or 2:3:2; 4:3:2 or 3:4:2 and so on until 11:10:2 or 10:11:2 or, generally, $(n+1):n:2$ or $n:(n+1):2$ whereby the value of $n$ is from 1 to about 10 as defined above.

Suitable dialkanolamines of the said type are, for example, N-di($\beta$-hydroxyethyl)- or -($\beta$-hydroxypropyl)-aniline, -p-chloroaniline, -pentachloroaniline, -p-toluidine, -diphenylamine and -$\beta$-naphthylamine.

Examples of suitable diisocyanates are tetramethylene and hexamethylene diisocyanate, p-phenylene diisocyanate, toluylene diisocyanate, p,p'-diphenylene diisocyanate, and 1,3,5-triisopropyl-phenylone diisocyanate-2,6.

Monoisocyanates which can be used are, for example, ethyl, propyl, butyl, allyl and methoxymethyl isocyanate, phenyl isocyanate, pentachlorophenyl isocyanate and naphthyl isocyanate.

Suitable monoalcohols and thioalcohols are, for example, ethanol, propanol, butanol and isobutanol and the corresponding thioalcohols as well as $\beta$-hydroxypropyl methacrylate, but preferably N-methyl- and N-ethyl-N-$\beta$-hydroxyethyl and -N-$\beta$-hydroxypropylaniline and -p-toluidine.

Suitable primary amines are, for example, ethylamine, n-butylamine, cyclohexylamine, aniline, toluidine, $\alpha$-naphthylamine and $\beta$-naphthylamine.

Examples of suitable secondary amines are diethyl-, dipropyl-, dibutyl-, diamyl-, diphenyl-, di-p-toluyl- and di-$\beta$-naphthylamine as well as mixed amines, such as methylethyl-, ethylpropyl-, ethylbutyl-, ethylphenyl-, ethyl-p-toluyl- and ethylnaphthylamine, morpholine and piperidine.

Examples of solvents which may be concurrently used for the preparation of the polyurethanes are dioxan, ethyl acetate, butyl acetate, toluene, o,m,p-xylene and dibutyl ether. These solvents are distilled off when the reaction is completed.

However, those solvents are preferred which contain polymerizable vinyl groups, as these need not be removed; they can be added together with the polyurethanes dissolved in them to the molding material intermediates, since they are copolymerized in the course of the subsequent hardening of the intermediates with the hardening products. Solvents of this type are, for example, vinyl acetate, allyl acetate, phthalic acid diallyl ester, 1,1,1-trimethylol-propane triallyl ether, ethyl acrylate, methyl methacrylate, styrene and vinyl-toluene.

The preparation of the new polyurethanes may be illustrated by the following Examples 1 to 4.

EXAMPLE 1

(molar ratio 2:1:2)

195 parts by weight N-di-($\beta$-hydroxyethyl)-p-toluidine (1 mole) are melted in a stirring vessel with the exclusion of moisture and heated to 110° C. Eighty-four Parts by weight hexamethylene diisocyanate (0.5 mole) are then added in the course of 1 hour. The reaction mixture is stirred at the same temperature for a further hour. 110 parts by weight phenyl isocyanate (1 mole) are then added at 110° – 120° C in the course of a further 1½ hours. After further stirring at 115° C for 1 hour, 0.5 parts by weight hydroquinone are added. A yellow-colored resin is obtained and is corresponding to formula I wherein $n = 1$.

EXAMPLE 2

(molar ratio 3:2:2)

292.5 Parts by weight N-di-($\beta$-hydroxyethyl)-p-toluidine (1.5 mole), 168 parts by weight hexamethylene diisocyanate (1 mole) and 110 parts by weight phenyl isocyanate (1 mole) are reacted as described in Example 1. The resinous polyurethane is stabilized by the addition of 0.82 parts by weight hydroquinone and is corresponding to formula I wherein $n = 2$.

EXAMPLE 3

(molar ratio 3:4:2)

260 parts by weight N-di-($\beta$-hydroxyethyl)-p-toluidine (1.33 mole) are reacted, as described in Example 1, with 299 parts by weight hexamethylene diisocyanate (1.78 mole). 135 parts by weight N-methyl-N-(β-hydroxyethyl)-aniline are then added at 120° C in the course of one-half hour. After further stirring at 120° C for 1 hour, the resinous polyurethane is stabilized by the addition of 0.875 parts by weight hydroquinone and is corresponding to formula II wherein $n = 3$.

EXAMPLE 4

(molar ratio 10:11:2)

194 parts by weight N-di-(β-hydroxyethyl)-p-toluidine (1 mole) are reacted, as described in Example 1, with 184.8 parts by weight hexamethylene diisocyanate (1.1 mole). 33 parts by weight N-ethyl-N-(β-hydroxyethyl)-aniline (0.2 mole) are then added at 120° C in the course of one-half hour. After further stirring at 120° C for 1 hour, the resinous polyurethane is stabilized by the addition of 0.875 parts by weight hydroquinone and is corresponding to formula II wherein $n = 10$.

The new polyurethanes are particularly suitable as additives to intermediates of polyester molding materials, i.e. to solutions of unsaturated polyesters in copolymerizable monomers which are converted, after the further addition of an organic peroxide, mainly a diacyl peroxide, into cold-hardening molding materials. Added amounts of the polyurethanes of about 0.1 to about 5 percent by weight, referred to the intermediate of the polyester molding material will be sufficient for the said purpose.

The new polyurethanes are characterized by their good compatibility with these intermediates, and the intermediates containing such an additive are themselves characterized by their good stability in storage. It is particularly noteworthy that the reactivity of the molding materials does virtually not decrease, even if the peroxide is added to the intermediates containing such a polyurethane after prolonged storage.

The unsaturated polyesters comprise, as is usual, condensation products of α,β-unsaturated dicarboxylic acids, optionally in admixture with other customary dicarboxylic acids, and dialcohols; the copolymerizable monomers also comprise the usual compounds, such as styrene and its homologues, e.g. vinyl-toluene and p-chlorostyrene, acrylic and methacrylic acid esters and esters of unsaturated alcohols, e.g. diallyl phthalate.

Diacyl peroxides are, for example, benzoyl, p-chlorobenzoyl, benzoylacetyl, phthalyl and lauroyl peroxides.

The polyurethanes can be added to the molding material intermediates as such, but preferably dissolved in a copolymerizable monomer, e.g. styrene, in the stated amounts.

The following Examples 5 to 7 illustrate the use of the new polyurethanes as additives to intermediates of polyester moulding materials.

EXAMPLE 5

2.7 parts by weight of a 70 percent by weight solution of the polyurethane prepared according to Example 1, in styrene, are admixed with 100 parts by weight of a 70 percent by weight solution of a polyester, prepared from 3,210 parts by weight maleic acid anhydride, 5421 parts by weight phthalic acid anhydride and 5,616 parts by weight 1,2-propylene glycol, in styrene. After the addition of 3 percent by weight of the commercial benzoyl peroxide paste, the polyester molding mass so produced hardens at 20° C in 7 minutes and 50 seconds. If, however, the intermediate containing the polyurethane is stored at room temperature for 3 weeks, the hardening time is almost unchanged: it amounts to 9 minutes and 10 seconds.

EXAMPLE 6

To 3 parts by weight of a 70 percent by weight solution of the polyurethane prepared according to Example 2, in styrene, there are added 100 parts by weight of the solution of polyester in styrene described in Example 5. When the peroxide paste is added immediately after preparation of the solution, the hardening time at 20° C again amounts to 7 minutes and 50 seconds. If the polyurethane-containing intermediate is first stored for 3 weeks, the hardening time amounts to 8 minutes and 25 seconds.

EXAMPLE 7

To 2.5 parts by weight of a 70 percent by weight solution of the polyurethane prepared according to Example 3, in styrene, there are added 100 parts by weight of the polyester solution in styrene described in Example 5. When the peroxide paste is added immediately after the preparation of the solution, the hardening time amounts to 10 minutes and 25 seconds; if the polyurethane-containing intermediate is first stored for 3 weeks, it amounts to 9 minutes and 50 seconds.

EXAMPLE 8

To 3 parts by weight of a 60 percent by weight solution of the polyurethane prepared according to Example 4, in styrene, there are added 100 parts by weight of the polyester solution in styrene described in Example 5. When the peroxide paste is added immediately after the preparation of the solution, the hardening time at 20° C amounts to 11 minutes; if the polyurethane-containing intermediate is first stored for 3 weeks, it amounts to 11 minutes and 10 seconds.

I claim:

1. A process which comprises reacting
   a. an N-aryl-substituted dialkanolamine of the formula

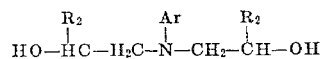

wherein Ar is aryl and $R_2$ is H or $-CH_3$ with
   b. a diisocyanate of the formula
   $$O = C = N - R - N = C = O$$
   wherein R is alkylene or arylene and
   c. a monoisocyanate of the formula
   $$R_1 - N = C = O$$
   or a monoalcohol of the formula
   $$HO - R_4$$
   or a monothioalcohol of the formula
   $$HS - R_4$$
   or a primary or secondary amine of the formula

wherein $R_1$ is alkyl, allyl, methoxymethyl or aryl, $R_4$ is alkyl or

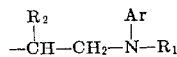

wherein Ar, $R_1$ and $R_2$ are as aforesaid, $R_5$ is H, alkyl or aryl and $R_6$ is alkyl or aryl, the molar ratio of (a):(b):(c) being $n:(n+1):2$ or $(n+1):n:2$ wherein the value of $n$ is from 1 to about 10 at a temperature from about 50° to about 150° C.

2. Process according to claim 1, wherein the molar ratio of the three reactants is from about 2:1:2 to about 6:5:2.

3. Process according to claim 1, wherein the molar ratio of the three reactants is from about 1:2:2 to about 5:6:2.

4. Process according to claim 1, wherein the reaction temperature is from about 80° to about 120° C.

5. Process according to claim 1, wherein dioxan, ethyl acetate, butyl acetate, toluene, o-, m-, p-xylene or dibutyl ether is used as a solvent.

6. Process according to claim 1, wherein a monomeric polymerizable vinyl compound is used as a solvent.

7. The product produced by the process of claim 1.

8. The product produced by the process of claim 2.

9. The product produced by the process of claim 3.

* * * * *